(12) United States Patent
Walker

(10) Patent No.: US 8,176,162 B2
(45) Date of Patent: *May 8, 2012

(54) EMAIL SERVER SYSTEM AND METHOD

(75) Inventor: Bruce Murray Walker, Mississauga (CA)

(73) Assignee: Watchguard Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,994

(22) Filed: Nov. 2, 2009

(65) Prior Publication Data

US 2010/0049818 A1 Feb. 25, 2010

Related U.S. Application Data

(63) Continuation of application No. 11/295,591, filed on Dec. 7, 2005, now Pat. No. 7,617,305.

(51) Int. Cl.
*G06F 15/173* (2006.01)
*G06F 15/16* (2006.01)

(52) U.S. Cl. ......... 709/223; 709/204; 709/205; 709/226

(58) Field of Classification Search .................. 709/202, 709/204, 205, 206, 219, 220, 221, 223
See application file for complete search history.

(56) References Cited

U.S. PATENT DOCUMENTS

| | | | | |
|---|---|---|---|---|
| 5,909,581 A * | 6/1999 | Park | ............................. | 717/170 |
| 5,919,247 A * | 7/1999 | Van Hoff et al. | ............... | 709/217 |
| 6,405,219 B2 * | 6/2002 | Saether et al. | ........................ | 1/1 |
| 6,691,117 B2 * | 2/2004 | Ellison et al. | ......................... | 1/1 |
| 6,892,230 B1 * | 5/2005 | Gu et al. | ........................ | 709/220 |
| 7,065,599 B2 * | 6/2006 | King et al. | .................... | 710/301 |
| 7,222,228 B1 * | 5/2007 | Stephens et al. | ................... | 713/1 |
| 7,406,473 B1 * | 7/2008 | Brassow et al. | ........................ | 1/1 |
| 7,441,019 B2 * | 10/2008 | Zintel et al. | .................... | 709/220 |
| 7,584,256 B2 * | 9/2009 | Osborne et al. | ............... | 709/206 |
| 8,045,954 B2 * | 10/2011 | Barbeau et al. | ............. | 455/404.1 |
| 8,073,967 B2 * | 12/2011 | Peterson et al. | .............. | 709/238 |
| 2001/0054106 A1 * | 12/2001 | Anderson et al. | ............. | 709/227 |
| 2002/0111990 A1 * | 8/2002 | Wood et al. | ..................... | 709/203 |
| 2006/0224704 A1 * | 10/2006 | Parikh et al. | ................... | 709/220 |
| 2006/0235997 A1 * | 10/2006 | Munirajan et al. | ............ | 709/245 |
| 2007/0040895 A1 * | 2/2007 | Barbeau et al. | ............. | 348/14.01 |
| 2007/0047008 A1 * | 3/2007 | Graham et al. | ............... | 358/401 |
| 2008/0109531 A1 * | 5/2008 | Jenkins | ......................... | 709/218 |

* cited by examiner

*Primary Examiner* — Ario Etienne
*Assistant Examiner* — Sargon Nano
(74) *Attorney, Agent, or Firm* — Kory D. Christensen; Stoel Rives LLP

(57) ABSTRACT

An email system comprises a plurality of email servers connected by a data communications network. The email system avoids single points of failure by employing multiple email servers which self configure, without requiring dedicated servers, through self addressing and discovery and announcement protocols. An email server can act as a primary email server by executing an administration tool allowing an administrator to modify the configuration data set which the email servers utilize, and the primary email server will then announce the resulting change in the version level of the configuration data set to other email servers. Each email server will then determine and request any needed updates to its respective configuration data set from the primary email server or another email server. The resulting email system is: robust, avoiding single points of failure; scalable, as additional email processing capacity can be achieved by adding additional email servers; and is simple to administer as changes to the configuration data set can be made at any email server with a copy of the appropriate administration tool and such changes automatically propagate through the email system.

10 Claims, 2 Drawing Sheets

EMAIL SERVER SYSTEM AND METHOD

FIELD OF THE INVENTION

The present invention relates to the provision of email services. More specifically, the present invention relates to an email server system and method.

BACKGROUND OF THE INVENTION

Email has assumed increasing importance in corporate and other environments wherein email communications are now used for almost every imaginable communication. While the ubiquity and take up of email has proven to be a boon to users, the sheer volume of email communications has offered many challenges to information technology departments and others who provide and maintain such services.

In particular, in many circumstances the volume of email at an installation exceeds the communications bandwidth and/or processing capacity of a single email server. In such circumstances, or in circumstances wherein it is desired to provide some redundancy for fault tolerance purposes, an installation may include multiple email servers, which are used within appropriate load balancing strategy, to process the total email load without exceeding the capacity of any one email server.

At the same time as providers of email services have had to deal with increasing volumes of email communication, they have also had to deal with evolving needs to control and/or regulate email communications. In particular, most email servers today include sets of policies, which must be enforced, routes, and/or services, such as aliases and groups, which must be implemented, as well as the ongoing need to administer email users' accounts.

The administration of email servers has become increasing complex and increasingly time consuming and the burden of administrating such servers increases every time another email server is added to an installation.

Previous attempts to deal with this increasing complexity and effort have employed a dedicated email administration server (DEAS) wherein the email provider makes any necessary changes and/or administration inputs and the DEAS then propagates the changes and/or inputs to each email server it administrates. However, such approaches are less than ideal as the DEAS is a single point of failure in the email system and, even if regular backups are maintained for the DEAS, in the event of a crash or other failure of the DEAS an email service outage will occur while the most recent backup is restored and/or the hardware of the DEAS is repaired.

Further, the DEAS and/or email administrator must have a mechanism for ensuring that each administered email server has correctly received and processed any updates or changes input into the DEAS and this can be difficult to achieve when the number of administered email servers is high and/or updates or changes occur frequently.

SUMMARY OF THE INVENTION

It is an object of the present invention to provide a novel system and method of clustering email servers which obviates or mitigates at least one disadvantage of the prior art.

According to a first aspect of the present invention, there is provided an email system comprising: a plurality of email servers, each of said email servers being connected to each other of said email servers via a data communications network, each of said email servers being operable to self configure itself on said data communications network to communicate with the others of said email servers and being further operable to process email received from and/or sent to said data communications network in accordance with a configuration data set stored on each server; one of said email servers being further operable to receive and effect changes, from an administrator, for the configuration data set stored on said one email server and to announce that the configuration data set stored on said one email server has been changed to the others of the email servers connected by the network and, in response to requests from email servers, providing the changes to the configuration data set to each requesting email server for storage and use thereon.

Preferably, the administrator can select any server from of a subset of the email servers to be said one email server. Also preferably, upon a failure of said one email server, the administrator can select another of said plurality of email servers to be said one email server.

According to another aspect of the present invention, there is provided an email server system, comprising: at least two email servers, each email server being in data communication with each other email server in the system via a data communication network and each email server being operable to establish its presence in said data communication network, each email server being further operable to process, in accordance with a configuration data set, email messages received and/or sent over the data communication network and wherein an administrator can connect to one of said at least two email servers through the data communication network to change the configuration data set, the one of said at least two email servers announcing the changed configuration data set to each other of the at least two email servers and providing the changed configuration data set to each other of the at least two email servers in response to requests received therefrom.

The present invention provides a email system comprising a plurality of email servers connected by a data communications network. The email system avoids single points of failure by employing multiple email servers which self configure, without requiring dedicated servers, through self addressing and discovery and announcement protocols. An email server can act as a primary email server by executing an administration tool allowing an administrator to modify the configuration data set which the email servers utilize, and the primary email server will then announce the resulting change in the version level of the configuration data set to other email servers. Each email server will then determine and request any needed updates to its respective configuration data set from the primary email server or another email server. The resulting email system is: robust, avoiding single points of failure; scalable, as additional email processing capacity can be achieved by adding additional email servers; and is simple to administer as changes to the configuration data set can be made at any email server with a copy of the appropriate administration tool and such changes automatically propagate through the email system.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
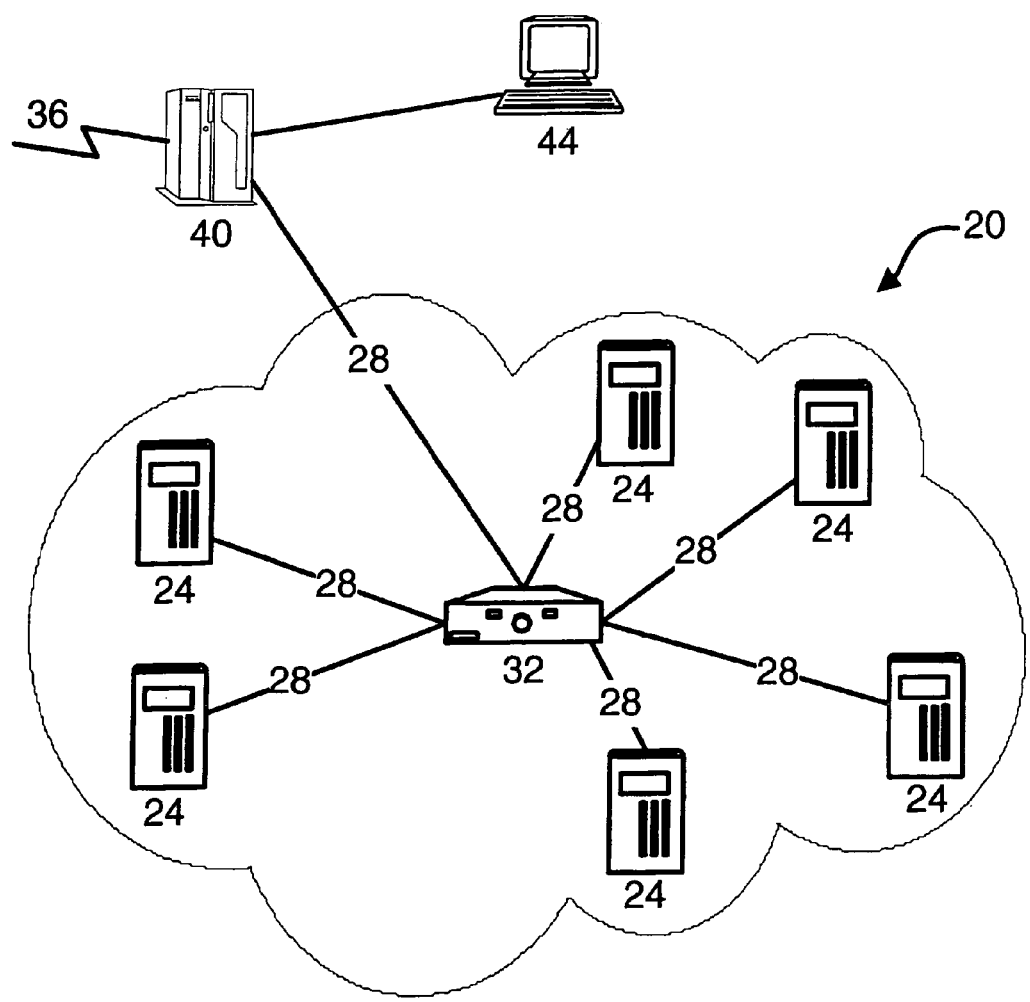
FIG. 1 shows a schematic representation of an email system in accordance with the present invention.

An email system in accordance with an embodiment of the present invention is indicated generally at 20 in FIG. 1. Email system 20 includes a plurality of email servers 24 which are interconnected by a data communications network preferably comprising data communications links 28 and a data switch 32. It will be apparent to those of skill in the art that the data communications network interconnecting email servers 24 can also be configured in a variety of other manners, such as with a hub instead of data switch 32, or in different topologies such as a ring or bus and such configurations are also within the scope of the present invention.

The construction of email servers 24 is not particularly limited and can comprise and suitable computing device for executing an email server program to process email communications. An example of such a suitable computing device includes a general purpose computer with an Intel Pentium 4 CPU and one gigabyte of RAM and a 160 GB hard drive, which executes the BSD Unix operating system and the Sendmail application. However, as will be apparent to those of skill in the art, the present invention is not limited to email servers constructed in such a manner and can instead be used with a wide variety of hardware and software systems appropriately configured to provide email services.

In particular, it should be noted that in the present invention email servers 24 need not be homogenously constructed, as one or more of email servers 24 can be constructed of hardware which differs from others of email servers 24, and need not even execute the same operating system, although this is presently preferred.

As mentioned above, each email server in email system 20 is interconnected by a data communications link 28 and a data switch 32. Preferably, data communications links 28, which can use Ethernet or other suitable transport protocols as will be apparent to those of skill in the art, employ an addressable protocol such as the Internet Protocol (IP) to allow email servers 24 to intercommunicate. When IP is used with email system 20, it is presently preferred that non-routable (so called "private" or "RFC1918") addresses are used by email servers 24. As is well known to those of skill in the art, the "C Class" of such addresses, which are in the range of from 192.168.0.0 to 192.168.255.255, are commonly used for such purposes.

One of the design goals for system 20 is to remove possible single failure points from system 20. For example, while data switch 32 is logically one device, it is preferred that data switch 32 is physically implemented as two or more data switches with automatic failover. Further, as shown, email system 20 comprises a plurality of email servers 24 such that failure of an email server 24 does not prevent continued operation of system 20.

More significantly, to further remove single points of failure, it is desired that network protocol services requiring a dedicated server, such as DHCP or DNS, are avoided and distributed network protocol services are instead employed. Therefore, self addressing and announcement and discovery protocols are employed in each email server 24 such that each email server 24 is assigned a valid and unique (within system 20) address and is made aware of the other email servers 24 and devices on the data communications network of system 20 without the need for dedicated devices in system 20. Such self addressing and announcement and discovery protocols are well known to those of skill in the art and, in a present embodiment of the invention which employs IP over an Ethernet transport layer, the Link-Local Addressing and related protocols and methods proposed by the Zeroconf Working Group (www.zeroconf.org) are utilized, although any other suitable self addressing and announcement and discovery protocols can be used as will be apparent to those of skill in the art. Examples of such other protocols can include the Bonjour protocol advanced by Apple Computer and others, or the Universal Plug and Play (UpnP) protocol advanced by Microsoft and others.

Email messages are supplied to and from email system 20 over an external network 36, which can be the Internet or any other network. In a presently preferred embodiment of the invention, a load balancer 40 interconnects external network 36 and the data communication network of email system 20. Load balancer 40 performs the necessary address translation (NAT) for devices on external network 36 to communicate with email servers 24 and also performs load balancing between email servers 24. Specifically, load balancer 40 directs messages from external network 36 to specific email servers 24 on a changing basis in an attempt to ensure that emails servers 24 have similar processing loads to prevent congestion and/or thrashing at any email server 24. Load balancers are well known and can employ simple scheduling/assignment algorithms such, as round robin, or more complex adaptive algorithms such as those which monitor response times from devices to which tasks are assigned to determine the actual processing load at a device. If email servers 24 in system 20 are not homogeneous, this latter adaptive type of load balancing is preferred.

Some load balancers 40 can also provide firewall services, such as those sold by F5 Networks of 401 Elliott Avenue West Seattle, Wash. 98119. If load balancer 40 does not provide firewall services and if such services are desired, then a separate firewall device can be provided between load balancer 40 and external network 36.

It is also contemplated that load balancer 40 can be omitted and email servers 24 in system 20 can instead self-implement load balancing via one or more of the known methods, such as "round robin DNS", but this is less preferred than having a separate load balancer 40, especially if email system 20 has email servers 24 with different processing capabilities, as such self implemented load balancing methods tend to be less effective at load balancing and are more susceptible to device failures.

An administration terminal 44 is connected to load balancer 40 by a direct data link or via external network 36. Administration terminal 44 can connect to that email server 24 in system 20 and is used to view and/or modify the configuration data set of system 20, as described below. The construction of terminal 44 is not particularly limited and, in a presently preferred embodiment, is any device, such as a general purpose personal computer, which can execute an HTML browser.

As mentioned above, each of email servers 24 executes an email server program. Each email server 24 executes the email server program in accordance with a variety of configuration data provided to it by the administrator of email system 20. Typically, this configuration data comprises several configuration data files and this set of configuration data files is referred to herein as the configuration data set.

The configuration data set comprises a database of all of the a wide variety of information, including email user account information, email routing data, email account alias information, email group information, etc. which an email server 24 requires to process email. In a present embodiment of system 20, this database is a database of flat (i.e.—non relational entries) ASCII text files which the email server program parses to determine its needed configuration data.

To change the configuration data set of email system 20, the administrator selects one of email servers 24 and executes an administration tool thereon. Using the administration tool, the administrator will set the state of the email server to reflect to the other email servers 24 that it is email server 24 which is executing the administration tool. This email server 24 executing the administration tool is referred to herein as a "primary" server.

Preferably, each email server 24 has a stored copy of the administration tool and the administrator can access any email server 24 to execute the copy of the administration tool stored thereon and promote that server to primary server status. While it is presently preferred that the administration tool check, at start up, to ensure that it is the only instance of the administration tool executing in email system 20, thus ensuring that only a single primary server exists at any time, this is merely a desired aspect and it is not overly problematic if two or email servers 24 have primary server status at the same time, as will become apparent from the discussion below.

The administration tool includes an HTML server so that the administrator can access the administration tool via a conventional web browser on administration terminal 44. Accordingly, in addition to the above-mentioned database of ASCII flat files, preferably the configuration data set further includes one or more HTML files which correspond to the ASCII contents of the flat file database. These HTML files are used by the HTML server component of the administration tool to construct the HTML pages displaying the present data stored in the ASCII flat files.

The administrator interacts with the pages displayed by the HTML server component of the administration tool to review the configuration data set of email system 20 and to effect desired changes to the configuration data set. Any changes made by the administrator are stored in the database and in the HTML files to obtain an updated configuration data set.

The operation of email system 20 will now be described. As mentioned above, each email server 24 in email system 20 executes self addressing, announcement and discovery protocols. With these protocols, when an email server 24 is connected to the data communication network, it first obtains a valid unique identifier which, in the case of the presently preferred embodiment which uses IP as the network protocol, is an IP address. Next, the added email server 24 announces itself to the other devices in email system 20, via a broadcast message, which indicates its address and the type of device it is (i.e.—an email server).

Each email server 24 in email system 20 maintains a list of the other devices in email system 20, which list includes the address and type of each device. Accordingly, when a newly added email server 24 announces itself to email system 20, each other email server 24 updates its list with the broadcast information. Further, each other email server 24 in system 20 sends a message to the newly added email server 24 informing it of its respective address and its type so that the newly added email server 24 can populate the list it maintains of all of the devices in email system 24. Depending upon the implementation of load balancer 40, load balancer 40 will either auto discover the newly added email server 24, or the administrator will explicitly notify load balancer 40 of the presence of the newly added email server 24. It is contemplated that, in other embodiments, load balancer 40 can also listen for broadcast messages from newly added email servers 24 and update its records accordingly.

Next, the added email server 24 broadcasts a message requesting the current version of the configuration data set for email servers 24 in email system 20. In response to this broadcast message, the email server 24 which is the primary server, or another designated email server 24, responds to the added email server 24 providing information allowing added email server 24 to determine if it has an up to date configuration data set. In a present embodiment, this response message includes a timestamp, or other version indicator, indicating the current version of the configuration data set for email system 20. Added email server 24 compares the received timestamp to the timestamp of its stored configuration data set and determines if it is up to date. If it is not up to date, added email server 24 requests primary email server or designated email server 24 to provide a timestamp for each file in the configuration database. Added email server 24 compares the received timestamps to the timestamps of its stored configuration database and determines which, if any, files need to updated.

Added email server 24 will then request the primary or designated email server 24 to provide it with the information needed to update the configuration data set files which are outdated. In a present embodiment, added server 24 asks the primary or designated email server 24 for the timestamp of each of the configuration data set files and the added email server 24 determines which, if any, of the files in its configuration data set are out of date files. The added email server 24 then requests the updated files from the primary or designated email server 24.

In a presently preferred embodiment, the added email server 24 identifies the out of date files that it wishes to update and provides the timestamp of each of those files to the primary or designated email server 24 which compares the received timestamp of each respective file to the timestamp of the up to date versions of each respective file and determines and transmits only the "deltas" (i.e.—the differences between the out of date file and the current file) to reduce the amount of data transmitted. It is however contemplated that complete replacement files can instead be transmitted if desired.

Once added email server 24 has updated its configuration data set to the current level, added email server 24 is a fully operational device in email system 20 and can begin processing email messages.

As email system 20 operates, an administrator can from time to time log into the primary email server 24 to access the administration tool to add or modify the configuration data set of email system 20. Once an administrator has modified and saved the configuration data set, primary email server 24 broadcasts a message within email system 20 indicating the version level of the updated configuration data set. Each email server 24 which receives the broadcast message compares the version of level of the updated configuration data set with the version level of its configuration data set to determine if it needs to be updated. If an email server 24 determines that the two version levels are not the same, the email server 24 will implement the above-described communication with the primary or designated email server 24 to update the configuration data set in the email server 24.

For redundancy, to ensure that each email server 24 is executing a current configuration data set within a reasonable time, the message from primary or designated email server 24 indicating the version level of the configuration data set can be broadcast several times to mitigate the chances of a corrupted transmission or other event precluding an email server 24 from receiving the message. Further, it is presently preferred that each email server 24 query the primary or designated email server 24 from time to time to ensure that the email server is executing the current version level of the configuration data set.

It is contemplated that, if email system 20 has a large number of emails servers 24 therein, it can be desired primary server 24 first update the configuration data set of one or more designated email servers 24 by directly notifying those designated email servers 24 of the current version level of the configuration data set. Once these designated email servers have had their configuration data sets updated, a broadcast message can be sent from the primary email server 24 to each email server 24 indicating the current version level of the configuration data set and indicating the addresses of the primary and designated email servers 24 from which the updated configuration data set can be obtained. Each email server 24 can then select one of the primary or designated email servers 24 from which to obtain the updated configuration data set. In this manner, the primary email server 24 will not be overloaded with requests from email servers 24 to update their configuration data sets and, if primary server 24 should suffer a failure before all of email servers 24 have been updated, the updating of the configuration data sets of the remaining email servers can be performed by the designated email servers.

It is further contemplated that any of email servers 24 can be selected to act as a primary email server 24 at any time. Specifically, an administrator can log onto any email server 24 and execute the administration tool, effectively promoting that email server 24 to primary status. It is presently preferred, although not essential, that only one email server 24 be acting as a primary server at a time. In such a case, as the administration tool is executed by the administrator the tool broadcasts a message informing each email server 24 that it is now the primary server. Any other email server 24 which was acting as a primary server and which receives this message will demote itself and no longer act as a primary server.

In the case where a primary server has an updated a configuration data set and is in the process of providing updates to email servers 24 when it suffers a failure, and if no designated email server 24 is present in system 20, then each email server 24 which is unsuccessfully attempting to receive the updated configuration data set from the primary server will "time out" after making a pre-selected number of attempts to contact the primary email server 24. Once an email server has experienced a time out, it will broadcast a message to the other email servers 24 in email system 20 requesting notification of the version levels of the other email servers 24 and the other email servers 24 will respond advising of their version levels. The email server 24 will review the responses and select one email server 24 from the email servers 24 that have replied with the highest current level configuration data set and will perform the above-described communication with the selected email server 24 to update the configuration data set in the email server 24. In the case of an email server 24 being added to system 20 after a failure of a primary server 24, a similar time out process will be performed.

It is further contemplated that one or more servers 24 can be designated reduced status email servers which are prevented from being selected to be primary or designated email servers. In such a case, the reduced status email servers operate as described above, except that they do not store a copy of the administration tool and thus cannot execute it. Further, as they have no need for the HTML files for the administration tool, their configuration data sets only include the database of flat ASCII files and they only update these files as version levels of the configuration data set change. Finally, such reduced status email servers 24 cannot update email servers 24 in the event of the failure of a primary email server 24.

Figure 2:
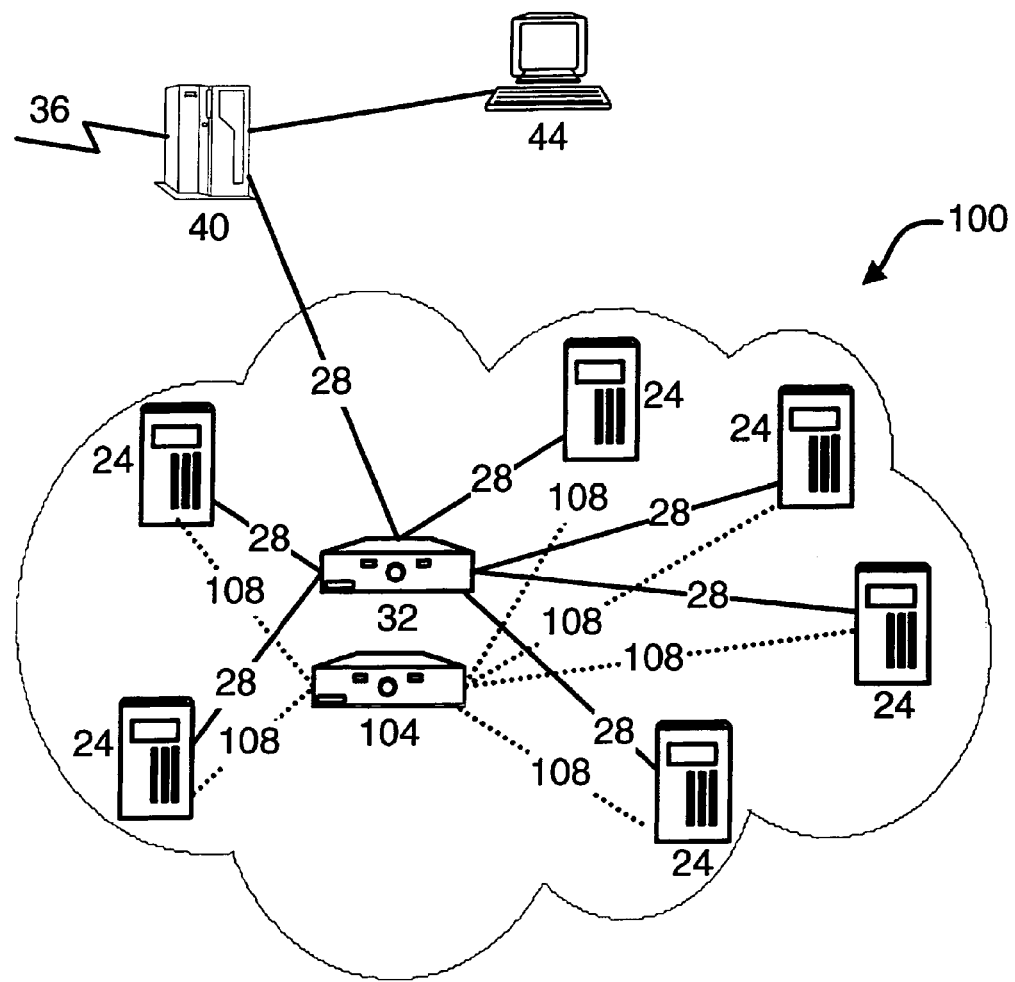
FIG. 2 shows a schematic representation of another embodiment of an email system in accordance with the present invention.

FIG. 2 shows another embodiment of an email system 100 in accordance with the present invention and wherein like components to those of email system 20 are indicated with like reference numerals. As illustrated, system 100 includes a second data communications network comprising a switch 104 and a set of communication links 108 (indicated in dashed line) to each email server 24. As will be apparent to those of skill in the art, this second data communications network operates in parallel to the first data communications network but is logically, and electrically, independent from it and is thus secure from it.

This second data communications is utilized as an administration and configuration network for email system 100 and messages and signals between email servers 24 relating to the above-described configuration database, self addressing and announcement and discovery protocols are effected through this second data communications network, rather than the data communication network of links 28 and switch 32. By using the second data communications network for the messages and signals relating to the configuration and administration of email system 100, a higher level of security is obtained within email system 100 as access to the configuration and administration data is not available to devices outside. In addition, increased communication speeds are often obtained on the second data communications network, relative to those obtained on the first data communications network, as there is less data traffic on the second data communications network. In this embodiment, the first data communications network carries email to and from each email server 23 and external network 36 and global management data, such as DNS lookups, time sync messages, LDAP and/or other policy lookups.

The present invention provides an email system 20, 100 comprising a plurality of email servers 24 connected by a data communications network. Email system 20, 100 avoids single points of failure by employing multiple email servers 24 which self configure, without requiring dedicated servers, through self addressing and discovery and announcement protocols. An email server 24 can act as a primary email server by executing an administration tool allowing an administrator to modify the configuration data set which the email servers 24 utilize and the primary email server will then announce the resulting change in the version level of the configuration data set to other email servers 24. Each email server 24 will then determine and request any needed updates to its respective configuration data set from the primary email server or another email server 24. The resulting email system 20, 100 is: robust, avoiding single points of failure; scalable, as additional email processing capacity can be achieved by adding additional email servers 24; and is simple to administer as changes to the configuration data set can be made at any email server 24 with a copy of the appropriate administration tool and such changes automatically propagate through system 20, 100.

The above-described embodiments of the invention are intended to be examples of the present invention and alterations and modifications may be effected thereto, by those of skill in the art, without departing from the scope of the invention which is defined solely by the claims appended hereto.

I claim:

1. An email system comprising:
a plurality of email servers, each of said email servers being connected to each other of said email servers via a data communications network, each of said email servers being operable to communicate with the others of said email servers and being further operable to process email received from and/or sent to said data communications network in accordance with a configuration data set stored on each server;
each one of said email servers being further selectable to act as a primary server and receive and effect changes, from an administrator, for the configuration data set stored on a selected one of the email servers,
wherein, in response to changes to the configuration data set of said selected email server, said selected email server to announce that the configuration data set stored on said selected email server has been changed to the others of the email servers connected by the network and, in response to requests from email servers, providing the changes to the configuration data set to each requesting email server for storage and use thereon, and wherein the selected email server is configured to present an HTML graphical user interface to the administrator to effect the changes for the configuration data set.

2. An email system according to claim 1, wherein the administrator can subsequently select another server from the subset of email servers to be said selected email server.

3. An email system according to claim 2, wherein, upon a failure of said selected email server, the administrator can select another of said plurality of email servers to be said selected email server.

4. An email system according to claim 1, wherein said selected email server stores both at least one HTML file reflecting the current settings of the configuration data set and at least one data file representing the configuration data set, said selected email server providing copies of both the at least one HTML file and the at least one data file to the plurality of email servers in response to the requests from the plurality of email servers.

5. An email system according to claim 4 wherein a subset of the plurality of email servers are limited email servers, each limited email server only storing the at least one data file of the configuration data set and the administrator being unable to select a limited email server to be said one email server.

6. An email system according to claim 1 further comprising a second data communications network connecting each of said plurality of email servers and wherein communications between said plurality of email servers relating to the announcement that the configuration data set stored on said selected email server has been changed and the provision of the changes to the configuration data set to requesting email servers occurs over the second data communications network.

7. An email server system, comprising:
at least two email servers, each email server being in data communication with each other email server in the system via a data communication network and each email server being operable to establish its presence in said data communication network, each email server being further operable to process, in accordance with a configuration data set, email messages received and/or sent over the data communication network, and
wherein any one of the at least two email servers is operable to act as a primary server by an administrator connecting to a selected one of the email servers through the data communication network to change the configuration data set of the selected email server,
wherein the selected email server is operable to announce the changed configuration data set to each other of the at least two email servers and to provide the changed configuration data set to each other of the at least two email servers in response to requests received therefrom in response to the change of the configuration data set of the selected email server, and
wherein the selected email server is operable to present an HTML graphical user interface to the administrator to effect the changes for the configuration data set.

8. The email server system of claim 7 wherein said data communication network employs the Internet Protocol.

9. The email server system of claim 8 wherein each said email server negotiates with each other email server to assign itself an IP address to establish its presence in said data communication network.

10. The email server system of claim 7 further comprising a second data communication network between the at least two email servers and wherein communications between the at least two email servers to announce a changed configuration data set and to provide the changed configuration data set to email servers occurs over the second data communication network.

* * * * *